Patented Mar. 16, 1948

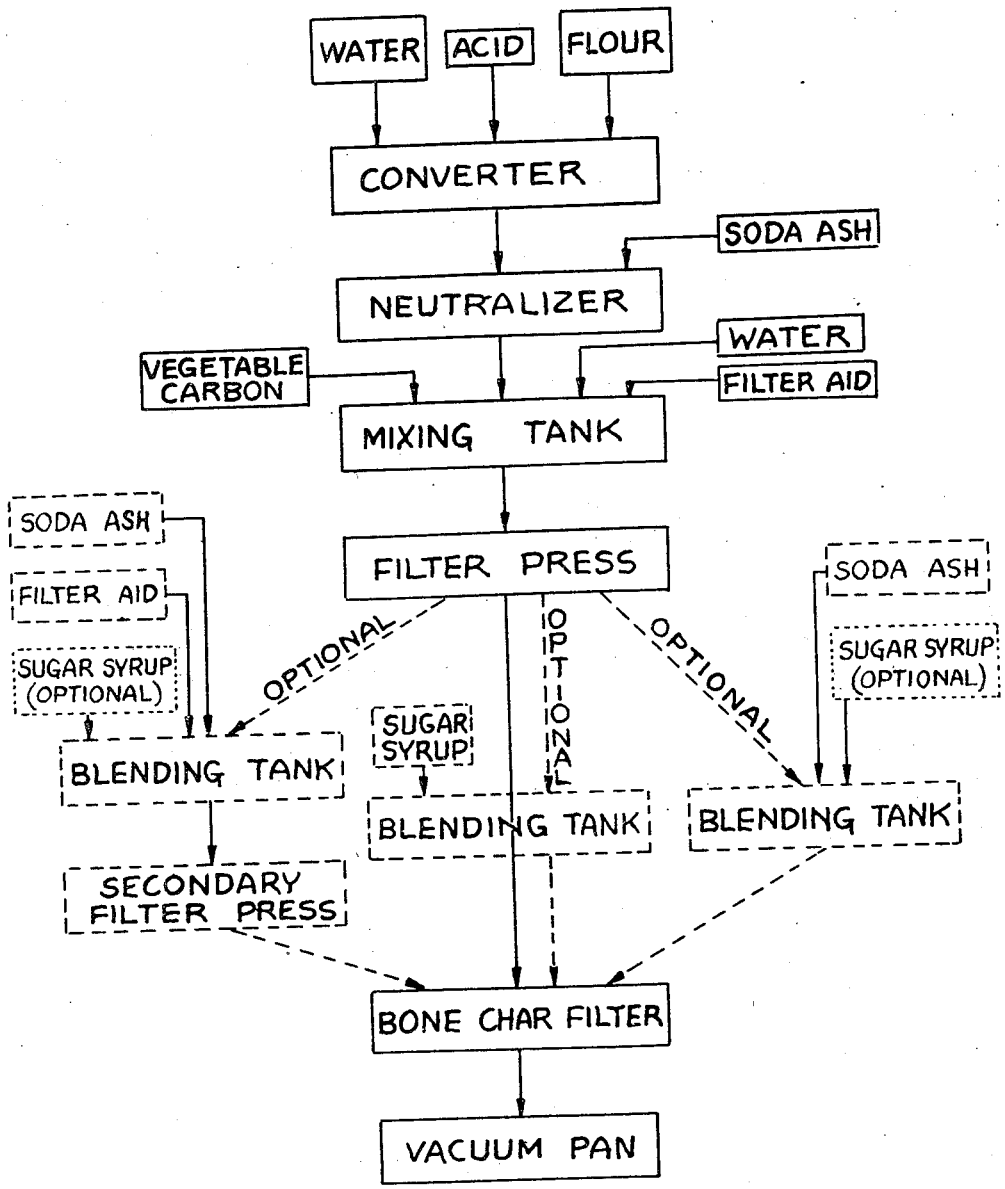

UNITED STATES PATENT OFFICE 2,438,033

DEXTROSE SYRUP

James M. Brown, Melrose, Watson A. Bemis, West Medford, and Frank A. Monroe, Jr., Melrose, Mass., assignors to Revere Sugar Refinery, Charlestown, Mass., a corporation of Massachusetts Application November 24, 1943, Serial No. 511,580

7 Claims. (Cl. 127—40)

This invention relates to the production of commercial sugar syrups from wheat flour, though it is equally applicable to the production of such syrups from rye flour.

The main object of the invention is the production of a commercial dextrose syrup by the direct conversion of conventional wheat flour.

Common commercial corn syrups are produced, not from corn flour, but from purified corn starch—i. e. from the starchy components of the corn grain remaining after lengthy preliminary processing of the grain to separate out the non-starchy components of the grain, such as the germ, fiber, gluten and other protein bodies. While dextrose syrups may be produced from wheat or rye starches, similarly purified, it is the purpose of this invention to produce conversion syrups directly from conventional wheat flour as distinguished from purified wheat starch. Such flour is prepared from the grain merely by the dry-process extraction of the germ and "bran" without separating out all the other non-convertible non-starchy components of the grain, as is done in the preparation from these same grains of the purified starches. Purified cereal grain starches are not abundant, due to limited facilities for performing purification operations. On the other hand, wheat grain, and its flour, the preferred material used in the practice of this invention, is particularly abundant. The products of this invention can thus be widely produced without being subject to the bottleneck of commercial starch purification.

The wheat derived conversion syrups manufactured in accordance with this invention have already found extensive use in the manufacture of ice cream, soft beverages, baked goods and table syrups.

For a proper understanding of the practical aspects of the production of syrups such as are to be herein described, one must recognize that for the purpose of conversions of the type herein described, producing dextrose equivalent contents in the range of 45 to 55%, flour slurries must be processed at relatively low densities in order to prevent the formation during conversion of heavy pastes which will burn in the converter or otherwise fail to convert properly. Unfortunately, the densities required for successful conversion are so low that, after conversion, the liquor is fermentable and cannot be stored at room temperature for any length of time without souring. The syrups at converted densities do not, therefore, withstand in saleable form normal conditions of storage and transportation.

Accordingly, an indispensable step following conversion is concentration (which is standard practice in the manufacture of commercial corn syrups converted from corn starch) to raise the density to a point (67% or more solids content) where fermentation does not occur. In the case of conversion direct from wheat flour, initial attempts in the production of commercial syrups ended in flat failure even after successful conversion because the low density converted liquor foamed so excessively that it could not be concentrated to the minimum density required for a non-souring syrup commodity. When concentration in a vacuum pan was attempted, the complete contents emptied over into the barometric condenser as foam.

There thus appeared the dilemma of being unable to convert the starchy components of the wheat flour to a dextrose equivalent content which would classify it as a commercial dextrose syrup, at concentrations high enough to prevent subsequent disastrous fermentation of the reducing sugars, and unable, because of miserable behavior in the vacuum pan, to escape the danger of fermentation by the normal corn syrup method of concentrating the low concentration converted syrup to a safe high solids content. The same dilemma was encountered with rye flour conversions. So far as we are aware, attempts to produce commercial dextrose syrups by the direct conversion of wheat flours, which, in contrast to starches, contain the non-convertible components extracted during normal starch manufacture, have been commercial failures prior to this invention.

In addition to the danger of fermentation souring, the foaming tendency was so great that the liquor could not be commercially handled even before souring. Open transfer of the liquor into transportation tanks, truck or railroad, was accompanied by so much foaming that the tank would receive only a fraction of its capacity in the form of liquor, the remaining space being occupied by foam.

This invention is concerned first with a successful conversion of wheat flour at an economically practical density to a dextrose syrup having a dextrose equivalent content in the range of 45 to 55%; and secondly, with a following treatment for effectively controlling the foaming tendency of the converted syrup to permit ordinary vacuum pan concentration of the liquor to non-souring form i. e. to a density exceeding about 67% solids content; all for the purpose of producing a non-foaming, stable dextrose syrup by the direct conversion of commercial flour.

With regard first to the conversion step, we have found that economical acid hydrolysis of high grade wheat flour at a density of about 35–40% solids content is possible when the raw flour is aded in such proportion to an acid-water mix, heated to 190° F. or more and maintained above such temperature throughout the flour addition. Moreover, the conversion is accomplished at relatively low temperatures. The conversion is designed, by the treatment hereinafter described, to achieve conversions showing 45-55% dextrose equivalent content.

With regard to the foaming tendencies, preliminary but careful analyses of the converted syrups of this invention lead us to believe that, because conversion of the starch component of the flour takes place prior to the separation of the non-convertible components of the flour from the convertible components, the converted liquor contains these non-convertible components, probably proteins or protein break-down products, both water-insoluble and water-soluble, in some physico-chemical form, possibly colloidal, which profoundly influences the character of a surface film formed by the liquor, and causes the uncontrollable frothing and foaming tendencies encountered. In any event, we have found that these foaming and frothing tendencies of the converted liquor vary inversely with its surface tension as the surface tension drops below that of water. It should be understood that low surface tension per se is not a cause of foaming, but in this particular instance, low surface tension is evidence of foaming tendency. Apparently, the surface tension, like the foaming tendency, is a mathematical function of the number or the particular form, or both, of these protein or other non-converted colloids contained in the converted syrup. At any rate, we have found that, in the case of these converted liquors, foaming tendency and surface tension are so related that the latter forms the basis for a firm control of the former during processing and, in accordance with this invention, the converted liquor is so treated that the surface tension thereof is restored to a critical minimum prior to concentration, thereby simultaneously reducing its foaming tendency towards or to a practical nullity. This restoration of proper surface tension permits vacuum pan concentration to a solids content satisfactory for insuring stability in storage. Coincidentally, the conditioning of the liquor in this manner insures that foaming tendencies will not be so great as to militate against ready flow in handling of the liquor after concentration.

The conditioning treatment which we have found effective to reduce the foaming tendency is produced by a combined treatment of the converted liquor, prior to concentration, with both vegetable carbon and bone char, though these combined treatments have the additional functions of deodorizing and decolorizing the converted syrup.

In order to satisfactorily discuss foaming tendency reduction, discussion thereof will be postponed until after an illustrative example of a wheat flour conversion, vegetable carbon treatment, filtration, bone char treatment and concentration is given.

The following ingredients have been successfully converted:

High grade wheat pastry flour (Washburn Crosby) _____ pounds__ 5000
Water _____ gallons__ 900
Muriatic acid _____ do____ 13

The water and muriatic acid are heated to 200° F. in a glass lined converter. We have successfully used a circular converter having an inside diameter of 7 ft., and which is provided with an agitator in the form of a 24 in. diameter, 3-blade marine propeller. This propeller is mounted for operation in a path spaced 4 or 5 inches from the bottom of the converter and adjacent the vertical wall thereof, so that it acts to circulate the slurry in a direction across the bottom of the converter. This propeller is operated at a speed of approximately 250 R. P. M. during both the mixing period and the conversion period. The flour is added continuously and evenly to avoid lumping while maintaining the temperature of the mix sufficiently high so that the formation of a doughy paste is not encountered. In our commercial operations, the mix is maintained above 190° F. during the entire mixing period, which may require normally 1 hour. Pressure of 11 to 15 (preferably 13) lbs. per sq. inch is then applied internally of the converter. This raises the temperature to 242° to 250° F. and conversion is completed in a matter of 25 to 40 minutes, as determined by constant sampling and the conventional starch-iodine reaction. Such conversions are designed to, and do, produce dextrose equivalent contents in the range of 45 to 55%.

As to the temperature of mixing, we regard a temperature of 175° F. as an absolute minimum to prevent the formation of a doughy paste with resulting unsatisfactory conversion. A temperature between 175° and 190° is possible but does not allow a proper margin of safety for general commercial operation. For this reason we recommend a minimum temperature of 190° F. and preferably 200° F.

After conversion is completed, the converted liquor is conveniently blown out of the converter to another tank where it is neutralized by the addition thereto of a neutralizer such as soda ash, lime, or bicarbonate of soda, in sufficient quantity to bring the pH up to between 4 and 5, preferably 4.3 to 4.8. Such neutralization conditions the liquor for press filtration which follows. The solids content at this point in the operation may be between 35 and 40% by weight. After the pH value has been thus satisfactorily adjusted, 75 lbs. of suitable vegetable carbon (for instance, Darco), and 100 lbs. of a filter aid, such as commercial diatomaceous earth, are added, plus enough water to bring the solids content to approximately 30% by weight. The solids content adjustment is likewise for the purpose of permitting satisfactorily rapid press filtering. The liquor is then filtered through a Sweetland press with the liquor being maintained between 150 and 160° F. at which temperature the liquor appears to retain its best color. This press operation is carried out in accordance with known practices, the pressure being increased as the filter cake builds up and offers a greater resistance to the filtering. The resulting filtrate is then percolated over bone char in the same range of temperature in accordance with sugar refining bone char filtering operation. The bone char is in an amount of about 40–100% of the weight of wheat-derived solids content and must be periodically reactivated in accordance with known procedure to maintain its desired effect.

Liquor thus treated may then be successfully concentrated in a vacuum pan to 67% or better solids content.

As practiced in our commercial operations, the press filtered wheat syrup, before char filtration, is added as an extender to a commercial water-white char-filtered cane sugar syrup of about 60 to 65° Brix in proportions which will bring the total solids content to the order of 42% by weight with the total solids being represented by 50% wheat-derived solids and 50% cane sugar-derived solids. Throughout blending, the temperature is maintained at 150 to 160° F. It will be understood that the blending is an optional procedure.

The above operations are diagrammatically indicated in the flow sheet of the drawing.

Analysis of the one conversion product made substantially in accordance with the above described process (not blended) is as follows:

| | |
|---|---|
| Dextrose | per cent__ 28.70 |
| Maltose hydrate | do____ 16.43 |
| Dextrin | do____ 31.24 |
| Ash (direct incineration) | do____ 1.06 |
| Ash (sulfate, uncorrected) | do____ 1.43 |
| Moisture by drying | do____ 19.58 |
| Direct polarization (26 gms. in 100 ml.) | ° S.__ 150.40 | the determination of dextrose, maltose, and dextrin being made essentially in accordance with the method of Steinhoff.

Average analyses of other products of this invention derived wholly from wheat flour, show:

| | |
|---|---|
| Brix | per cent__ 81.5 |
| Color (caramel scale) | 19 |
| pH | 6 |
| Direct polarization (26 gms. per 100 ml.) | degrees__ 136.80 |
| Dextrose equivalent | per cent__ 45–55 |

High conversion yields are secured, being in the range of 90 to 92%.

Surface tension readings in dynes per centimeter have been made of samples taken at various intervals in the process using the Du-Nüoy tensiometer.

| | Surface Tension in Dynes/cm. | Brix Reading | pH | Color (Caramel Scale) |
|---|---|---|---|---|
| Water into converter | 72 | | | |
| Water and acid in converter | 43 | | | |
| Flour, water, acid in converter | 43 | | | |
| Converted syrup | 43 | | | |
| Composite syrup ready for press filtration | 48 | 31.60 | 4.7 | |
| Composite press filtered syrup | 50 | 29.9 | 4.8 | 10 |
| Added cane sugar syrup | 82 | 61.85 | 7.1 | 2 |
| Composite syrup ready for char filters | 51 | 39.70 | 5 | 10 |
| Composite syrup off char filters | 70 | 38.3 | 6.8 | 3 |
| Concentrated syrup out of vacuum pan | 83 | 73.8 | 6.0 | 15–20 |

In another production of straight wheat syrup, without the addition of the water-white char-filtered cane syrup, the following results were secured:

| | Surface Tension in Dynes/cm. | Brix Reading | pH | Color (Caramel Scale) |
|---|---|---|---|---|
| Syrup out of converter | | 31.45 | | 10 |
| Ready for press filtration | 45 | 27.10 | 4.4 | |
| Press filtered | 50 | 27.70 | 4.8 | 10 |
| Char filtered | 70 | 26.20 | 6.8 | 3 |
| Concentrated liquor | (¹) | 73.65 | 6.7 | 15–20 |

¹ Beyond the range of instrument—above 84.

In the case of both the above tabulations it will be seen that there is a substantial increase in surface tension between final conversion of the syrup and the completion of press filtration, together with a further substantial increase between the completion of press filtration and the completion of bone char treatment. The surface tension of the water used was 72 as shown so that the syrup off the bone char at a figure of 70 approached restoration to a figure conforming with that of water. It will further be noted that surface tension is substantially independent of the Brix reading, for instance, the tabulation showing that the addition of 61.85 Brix reading cane sugar syrup having the high surface tension value of 82 to a press filtered wheat syrup having a Brix reading of 29.9 and a surface tension value of 50 did not result in any substantial change in the surface tension value of the composite, which rose only to 51 despite the increase in the Brix reading from 29.9 to 39.70.

It has further been found that the order of vegetable carbon and bone char treatment is not of importance so that the vegetable carbon treatment may either precede or follow the bone char treatment. If vegetable carbon treatment follows bone char treatment, the liquor should be press filtered with filter aid prior to char treatment, as well as after addition of the vegetable carbon. However, treatment with the vegetable carbon followed by press filtration alone is insufficient to secure non-foaming stability and likewise bone char treatment alone is insufficient.

From the above observations, it is our belief that the unconverted components of the raw flour, including water-soluble proteins, water-insoluble proteins and other unconverted bodies remaining in the liquor after conversion, either because of their mere presence or because of their particular finely divided colloidal form or for some other reason, so stabilize film surfaces formed by the liquor that bubble formation is sustained even at room temperature upon agitation, thus producing the troublesome foaming. In accordance with this belief, our explanation for the success of our treatment is that the vegetable carbon treatment followed by the press filtration acts to alter the form of and/or remove a certain proportion of these foam-imparting constituents—water-soluble or water-insoluble; and that the additional bone char treatment acts either to absorb further colloidal bodies having foam-imparting properties or else to coagulate such further colloidal bodies as a result of a rise in pH value of the liquor caused by contact of the liquor with the relatively alkaline bone char, so that they precipitate out of the liquor during or immediately subsequent to the bone char filtration. In any event, the removal, alteration, or modification of water-soluble non-converted components of the raw flour by the combined action of the vegetable carbon and bone char treatments, has the effect of restoring to the liquor a surface tension value comparable to the surface tension of water accompanied by a disappearance of troublesome foaming tendency after the surface tension of the liquor has a value of at least 65 dynes/cm.

In accordance with the above theory, we have found that the benefits accompanying the rise in pH value incident to the passing of the liquor over the relatively alkaline bone char may be separately accomplished in an alternative step intervening press filtration and bone char treatment, as indicated in the left hand alternative of the flow sheet of the drawing. Thus the press filtrate, whether or not blended with cane sugar syrup, may be adjusted to pH 6.8 to 7.8, preferably around 7.2, by the addition of soda ash or other neutralizing treatment, and then subjected to a secondary press filtration, a suitable filter aid being added.

Such secondary filtration apparently acts upon unconverted flour components not affected by the primary filtration. The adjusted pH value indicates that the secondary filtration extracts bodies having higher isoelectric points than the bodies extracted during the primary filtration. Nevertheless, such secondary filtration does not relieve the necessity of bone char treatment at some stage in the process, indicating that the bone char treatment acts favorably upon bodies not reached by either primary or secondary filtration or by the vegetable carbon. Our experience is that where the three treatments are used, each has its individual effect on the conditioning of the liquor for concentration, the individual effects cumulatively insuring non-foaming stability. The fact that the secondary filtration at the higher pH is not essential, indicates that the beneficial effects of this secondary press filtration are, in some measure at least, inherent in the bone char treatment, though these effects are desirably secured in a separate press filtration in order to relieve the bone char of a portion of its burden. A measure of relief on the bone char may also be secured by adopting the intervening step of pH adjustment but without secondary filtration as indicated in the right hand alternative of the flow sheet of the drawing.

In support of the above theoretical discussion, protein analyses of unblended wheat syrups show the following:

|  | Protein Content | |
| --- | --- | --- |
|  | "As Is Basis" By Volume [1] | Estimated Dry Content by weight |
|  | Per cent | Per cent |
| Wheat flour | 7.2 | 8.5 |
| Converted syrup ready for press filtration | 4.1 | 8.5 |
| Converted syrup after primary press filtration | 0.68 | 1.1 |
| Converted syrup after secondary press filtration | 0.41 | 0.7 |
| Converted syrup after char filtration | 0.23 | 0.4 |
| Final concentrated syrup | 0.39 | 0.4 |

[1] In accordance with the official method given at page 167 of the Handbook of the Association of Official Agricultural Chemists.

Referring to the estimated dry content figures, it will be seen that the protein content is reduced from 8.5 to 1.1% by the primary filtration indicating extraction of bodies insoluble at the pH of primary filtration; is reduced to .7% by the secondary filtration, indicating extraction of bodies insoluble at the higher pH; and is finally reduced to 0.4% by the char filtration, indicating extraction of further bodies, probably water-soluble at the pH values of both primary and secondary filtration. Where the secondary press filtration step is omitted, the syrup after char filtration has still had a protein content value of about 0.4%. This protein content, indicated as water-soluble, is to be contrasted with a normal commercial corn syrup protein content of .12%.

Where the secondary press filtration is resorted to in the conditioning treatment, the vegetable carbon may, if desired, be added after primary press filtration and prior to secondary press filtration, though we believe that the vegetable carbon treatment is more effective at the lower pH value of primary filtration.

Where the wheat flour converted syrup is added as an extender to a char filtered cane sugar syrup prior to concentration, it will be understood that the proportion of extension may be varied to suit the particular purposes of the individual manufacturer, and that various blends of differently derived syrups may be made.

As used in this application, the term dextrose equivalent is used to indicate the percentage of reducing sugars expressed as dextrose on a dry substance basis, as defined by Fetzer (Ind. & Eng. Chem., vol. 28, p, 885, August, 1936). With relation to Brix, the formula is:

$$\text{Dextrose equivalent} = \frac{\% \text{ wet invert} \times 1.042}{\text{Brix reading}} \times 100$$

Conversion of rye flours requires a slightly longer period than the conversion of wheat flours for which reason wheat flours are used in preference to rye flours, though successful results may be secured with rye flour, or with mixtures of rye and wheat flours.

We claim:

1. The process of manufacturing conversion syrups from commercial cereal grain flour which includes the steps of converting the convertible components of said flour prior to separation from the flour of water-soluble non-convertible components thereof, and after conversion separating unconverted water-insoluble components from said flour conversion product and contacting the conversion product with both vegetable carbon and bone char to condition said conversion product for concentration.

2. The process of manufacturing conversion syrups from commercial cereal grain flour which includes the steps of converting the convertible components of said flour prior to separation from the flour of water-soluble non-convertible components thereof, contacting said flour conversion product with vegetable carbon, separating water-insoluble unconverted components of the conversion product after such vegetable carbon treatment, and then contacting said conversion product with bone char to condition said conversion product for concentration.

3. The process of manufacturing conversion syrups from commercial cereal grain flour which comprises converting the convertible components of said flour prior to separation from the flour of water-soluble non-convertible components thereof, then separating unconverted water-insoluble components from the flour conversion product by filtering a water dispersion thereof at between 4 and 5 pH, by then refiltering said dispersion at between 6.8 and 7.8 pH, and at some stage of the process prior to said refiltration contacting the conversion product with vegetable carbon, and finally contacting the conversion product with bone char and then concentrating said dispersion.

4. A method of reducing foaming tendency in a converted cereal flour dextrose syrup comprising contacting the converted flour syrup successively with a vegetable carbon and then bone char.

5. A method of treating a converted cereal flour syrup having a foaming tendency evidenced by a low surface tension of approximately 40 dynes per centimeter, to reduce said foaming tendency which comprises contacting the converted flour syrup successively with a vegetable carbon and then bone char to increase the surface tension to at least 65 dynes per centimeter.

6. In the manufacture of commercial dextrose syrup from commercial wheat flour involving conversion of the starch component of the wheat flour prior to separation of water-soluble non-convertible components of the flour, that method of conditioning said converted flour syrup for vacuum pan concentration which comprises contacting said converted syrup with both a vegetable carbon and bone char.

7. The process of manufacturing stable dextrose syrup from commercial wheat flour which comprises adding wheat flour to a starch conversion acid-water mix in the proportion of about five pounds of flour to one gallon of water while maintaining the mix at a temperature exceeding 190° F. during addition of the flour, pressure-heating the flour-acid-water mix at a temperature of 242-250° F. to convert the convertible components of the flour to form a dextrose syrup, then separating unconverted water-insoluble components of the wheat flour from the converted syrup and contacting the converted syrup with both vegetable carbon and bone char to increase the surface tension of the converted syrup to at least 65 dynes per centimeter, whereby said syrup may be concentrated, and then concentrating said syrup under vacuum to a solids content exceeding 67%.

JAMES M. BROWN.
WATSON A. BEMIS.
FRANK A. MONROE, JR.

REFERENCES CITED

The following references are of record in the file of this patent:

UNITED STATES PATENTS

| Number | Name | Date |
|---|---|---|
| 7,148 | Riley | Mar. 5, 1850 |
| 20,347 | Hoffman | May 25, 1858 |
| 2,137,973 | Daly et al. | Nov. 22, 1938 |
| 2,162,379 | Dole | June 13, 1939 |
| 2,307,491 | Daly et al. | Jan. 5, 1943 |
| 2,307,725 | Daly et al. | Jan. 5, 1943 |
| 2,319,649 | Walsh | May 18, 1943 |
| 2,372,996 | Wickenden | Apr. 3, 1945 |

FOREIGN PATENTS

| Number | Country | Date |
|---|---|---|
| 509,710 | Great Britain | July 19, 1939 |

OTHER REFERENCES

Sugar Analysis, Brown & Zerban, 3rd ed., N. Y. 1941, pages 1104 through 1106. (Copy in Division 43.)

Fairrie, Sugar, 1st ed., Liverpool 1925, page 149. (Copy in Div. 43.)

Spencer-Mead Cane Sugar Handbook, 8th ed., New York, 1945, page 331.